Figure 17:
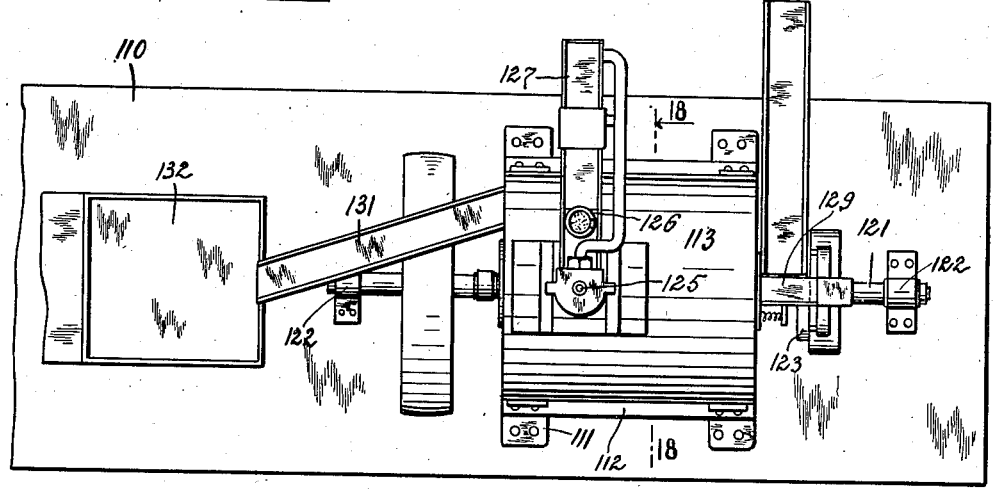

A. BOGDÁNFFY.
MACHINE FOR THE MANUFACTURE OF BOTTLE CLOSURES.
APPLICATION FILED MAY 29, 1912.
1,068,850.
Patented July 29, 1913.
6 SHEETS—SHEET 1.
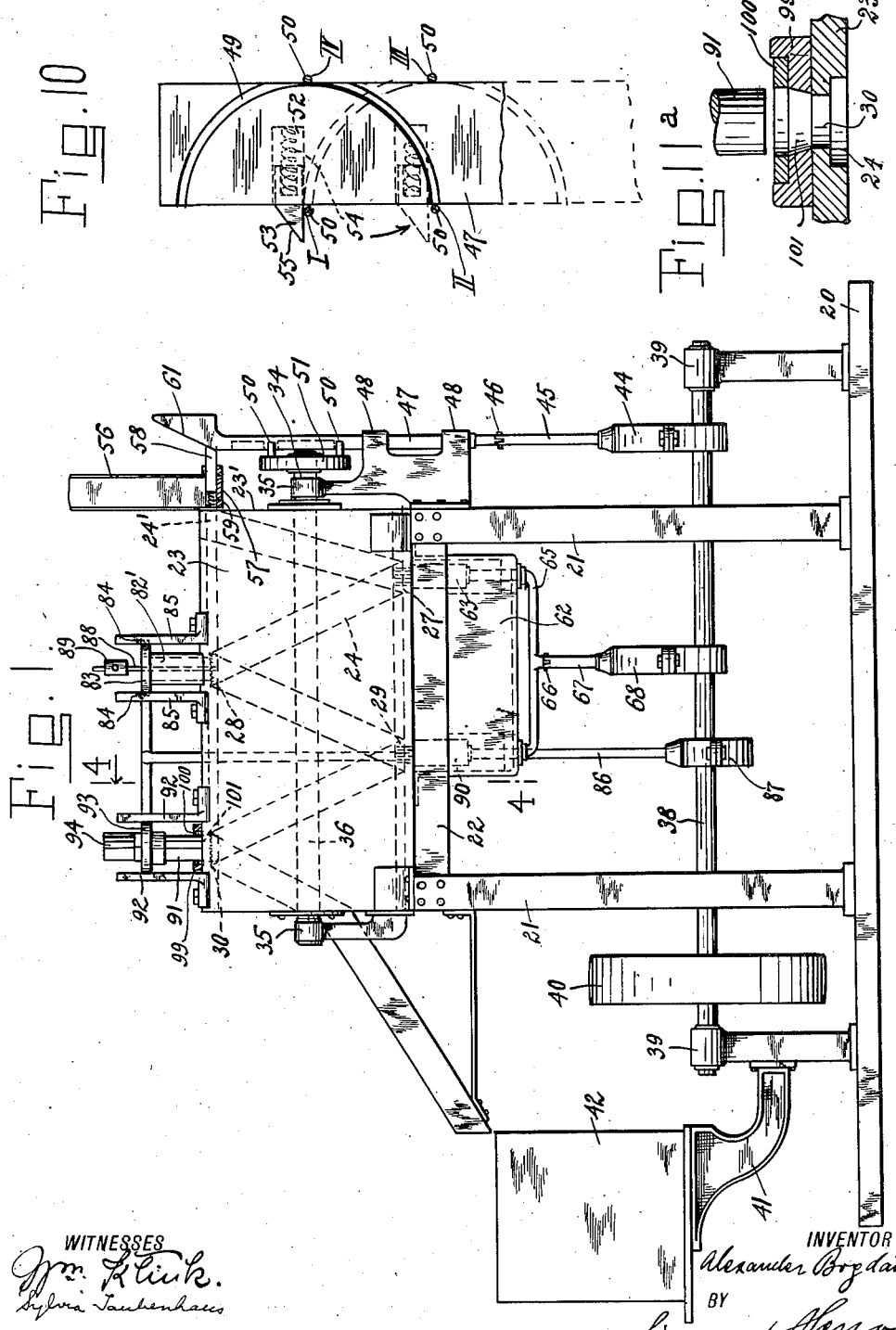

A. BOGDÁNFFY.
MACHINE FOR THE MANUFACTURE OF BOTTLE CLOSURES.
APPLICATION FILED MAY 29, 1912.
1,068,850.
Patented July 29, 1913.
6 SHEETS—SHEET 2.
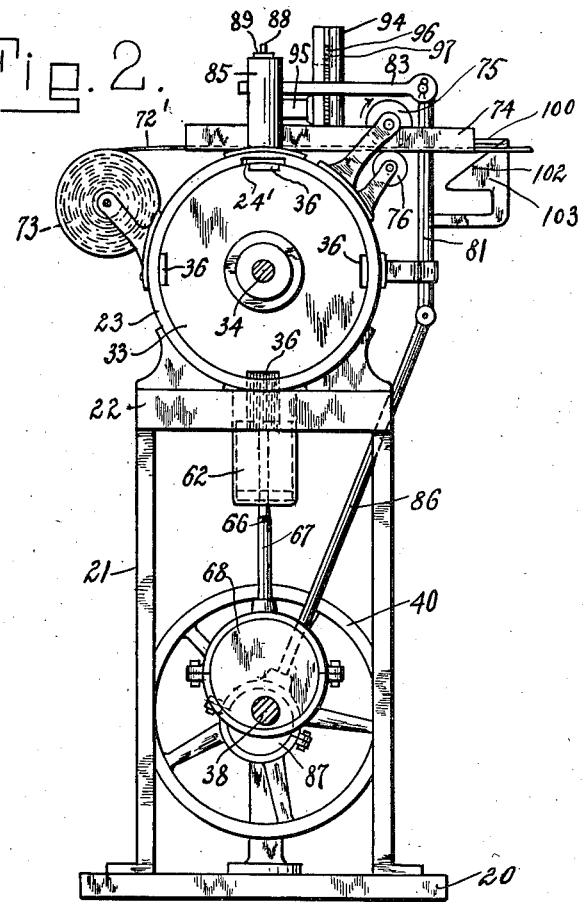
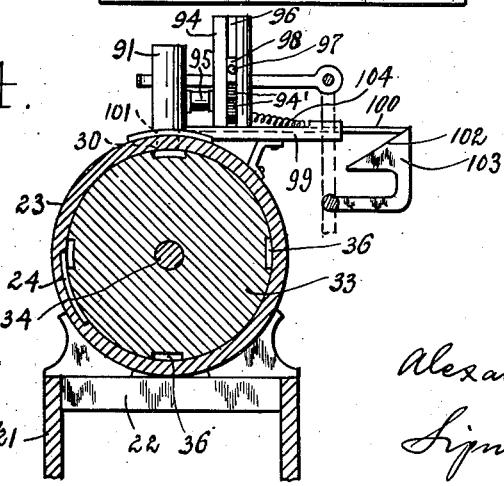
WITNESSES
INVENTOR
Alexander Bogdánffy
BY
his ATTORNEY A. BOGDÁNFFY.
MACHINE FOR THE MANUFACTURE OF BOTTLE CLOSURES.
APPLICATION FILED MAY 29, 1912.
1,068,850.
Patented July 29, 1913.
6 SHEETS—SHEET 3.
Fig. 3.
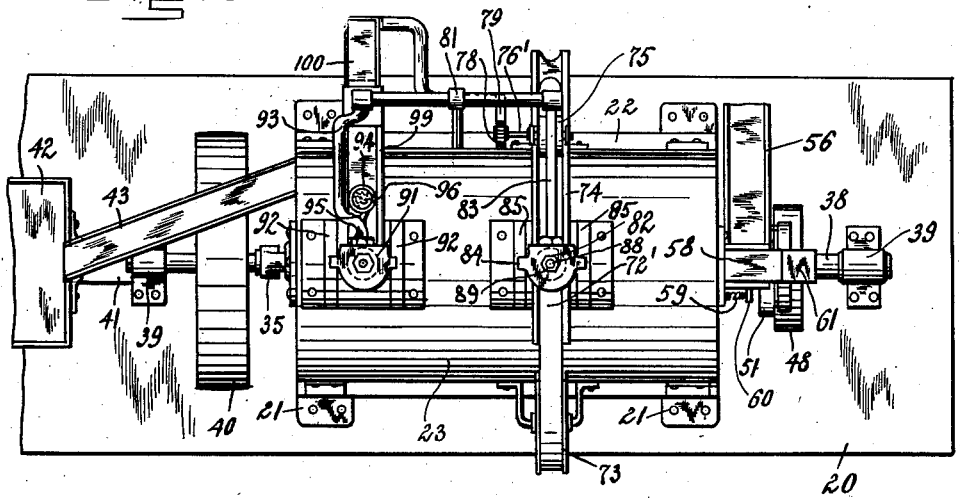
Fig. 11.
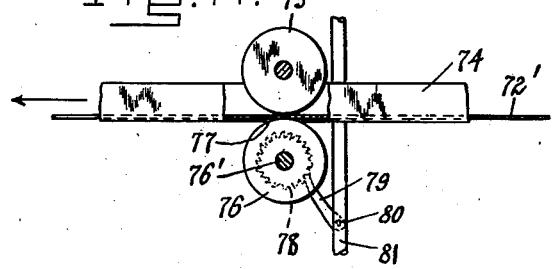
Fig. 5.      Fig. 6.      Fig. 7.
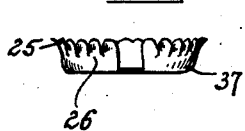 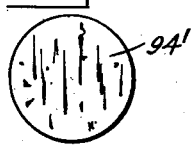 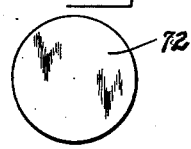
Fig. 12.
WITNESSES
INVENTOR
Alexander Bogdánffy
BY
Sigmund Herzog
his ATTORNEY A. BOGDÁNFFY.
MACHINE FOR THE MANUFACTURE OF BOTTLE CLOSURES.
APPLICATION FILED MAY 29, 1912.
1,068,850.
Patented July 29, 1913.
6 SHEETS—SHEET 4.
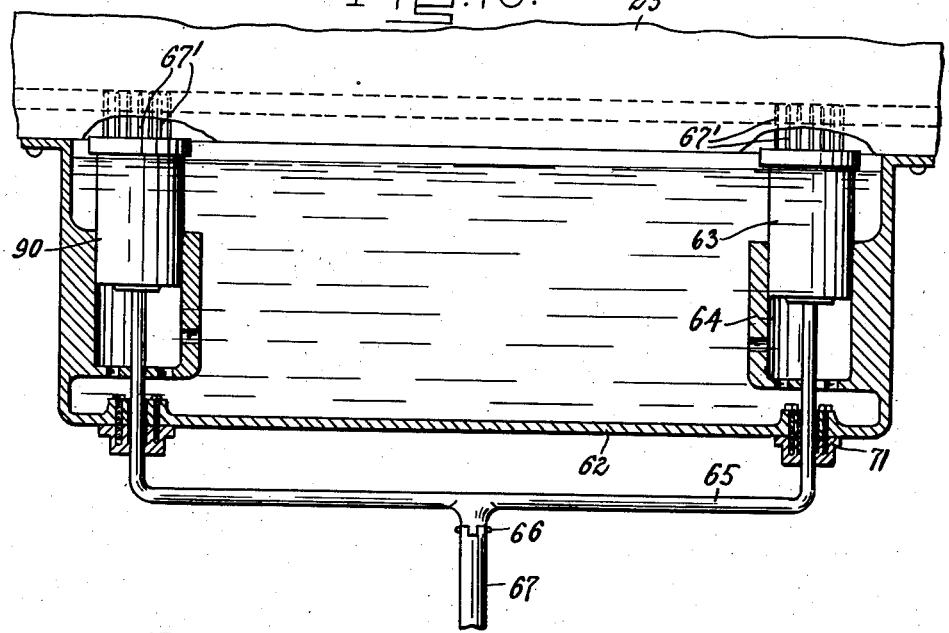
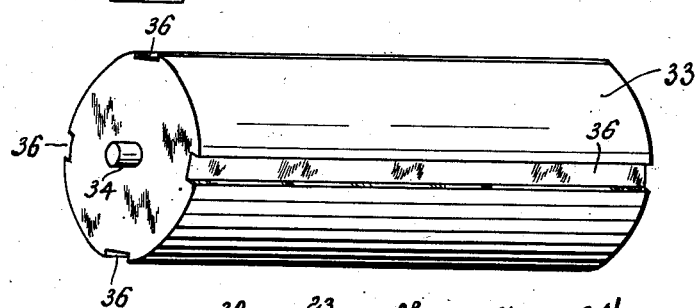
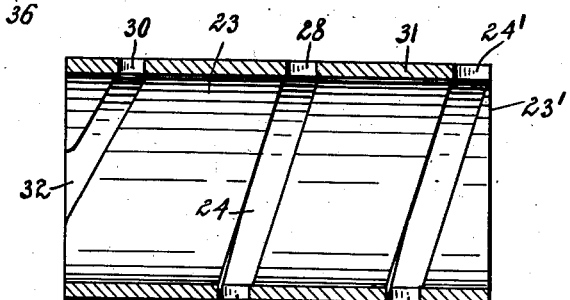

A. BOGDÁNFFY.
MACHINE FOR THE MANUFACTURE OF BOTTLE CLOSURES.
APPLICATION FILED MAY 29, 1912.
1,068,850.
Patented July 29, 1913.
6 SHEETS—SHEET 5.
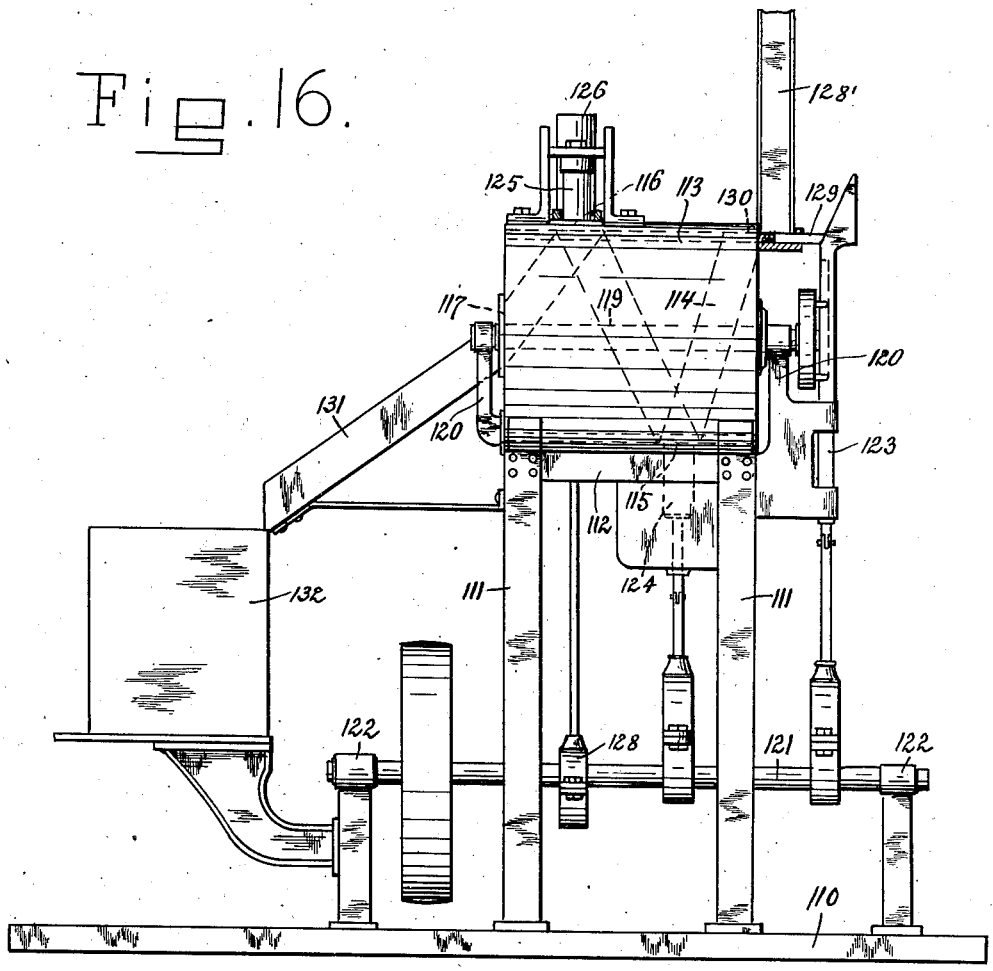
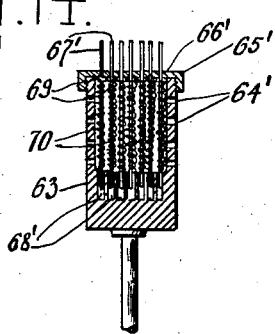
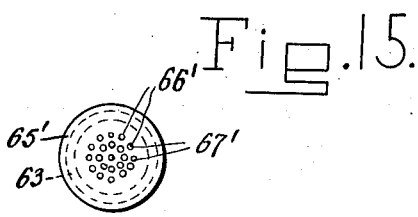

A. BOGDÁNFFY.
MACHINE FOR THE MANUFACTURE OF BOTTLE CLOSURES.
APPLICATION FILED MAY 29, 1912.

1,068,850.

Patented July 29, 1913.

6 SHEETS—SHEET 6.

WITNESSES

INVENTOR
Alexander Bogdánffy
BY
his ATTORNEY

UNITED STATES PATENT OFFICE.

ALEXANDER BOGDÁNFFY, OF NEW YORK, N. Y., ASSIGNOR TO THE INTERNATIONAL CORK CO., OF NEW YORK, N. Y.

MACHINE FOR THE MANUFACTURE OF BOTTLE-CLOSURES.

1,068,850.  Specification of Letters Patent.  Patented July 29, 1913.

Application filed May 29, 1912. Serial No. 700,453.

*To all whom it may concern:*

Be it known that I, ALEXANDER BOG-DÁNFFY, a subject of the King of Hungary, and resident of the city of New York, in the county of Kings and State of New York, have invented certain new and useful Improvements in Machines for the Manufacture of Bottle-Closures, of which the following is a specification.

The present invention relates to machines for the manufacture of bottle closures of the class known as "crown cork sealing caps or closures." Closures of this type comprise usually three parts, that is a metallic cap or crown having a corrugated flange to be locked to the exterior of the bottle neck, a sealing disk or packing of cork or the like, and a disk of impervious material interposed between the metallic cap and the packing disk. The purpose of this interposed impervious disk is to provide a hermetic seal and to prevent bottled liquids from taint by contact with the metal of the cap and the incident corrosion of the metal. Heretofore, as far as known, the interposed disk of impervious material was in most cases fusible, serving at the same time to unite the sealing disk of cork or other material with the metallic cap. In manufacturing such closures, the interposed impervious disk, therefore, had to be subjected to heating action to properly fuse the same, and the assembled closures had to be subjected to pressure while the binding material was hardening in order to unite the packing disk with the metallic cap. Most of the machines heretofore in use applied cooling devices also, to the influence of which the assembled closures were subjected while the interposed fusible binding material was hardening.

The object of the present invention is to provide a machine for the manufacture of bottle closures which does away with all kinds of heating and cooling devices, and in which the parts of the closure are in no way subjected to heating action, which action obviously affects a great deal the cork or packing disk in that it impairs the sealing properties of the same.

Another object of the invention is to produce a machine which assembles and unites the parts of the composite closure in a quick, reliable and efficient manner, renders the inner face of the sealing disk impervious and assures a firm union of the metallic cap and sealing disk, providing thereby a closure in which the liquid is prevented from reaching the metallic cap of the closure when in use on a bottle, and in which the gases with which the liquid may be charged cannot work their way through the closure.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and minor details of construction within the scope of the appended claims without departing from the spirit or sacrificing any of the advantages of the invention.

Two of the many possible embodiments of the invention are illustrated in the accompanying drawings, in which:—

Figure 18:
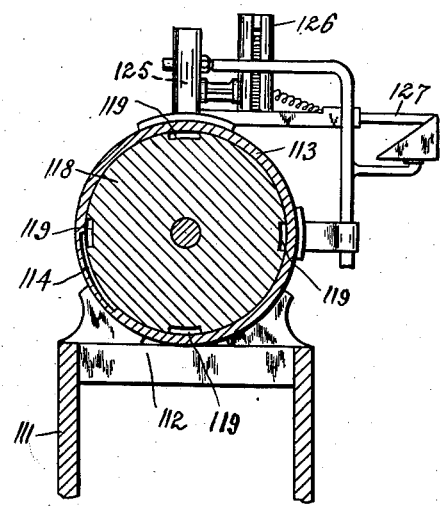

Figure 1 is a front elevation of a machine embodying the present invention; Fig. 2 is a side elevation of the same; Fig. 3 is a plan view thereof; Fig. 4 is a section taken on line 4—4 of Fig. 1; Fig. 5 is a sectional view of a metallic cap inverted; Fig. 6 is a plan view of the sealing disk of the closure; Fig. 7 is a plan view of the interposed disk of the closure; Fig. 8 is a perspective view of the feeding drum of the machine; Fig. 9 is a vertical longitudinal section of a portion of the main frame of the apparatus which coöperates with the feeding drum; Fig. 10 is a side elevation of the means for actuating the feeding drum; Fig. 11 is a side elevation, partly in section, of the means for feeding a strip of paper or like material from which the interposed disks are cut out; Fig. 11ᵃ is a section taken through the means for feeding the sealing disks into the caps; Fig. 12 is a section taken through portions of the main frame of the apparatus and of the feeding drum with a cap in position therein; Fig. 13 is a sectional view of the means for applying adhesive material to the metallic cap and the interposed disk; Fig. 14 is a section taken through the reciprocating plunger shown in Fig. 13; Fig. 15 is a top elevation of the plunger shown in Fig. 14; Fig. 16 is a front elevation of a modified apparatus; Fig. 17 is a plan view thereof;

and Fig. 18 is a section taken on line 18—18 of Fig. 17.

In the drawings, the numeral 20 designates a base plate, by which are supported legs or standards 21, carrying a horizontal frame member 22, to which is attached in any suitable manner a cylinder 23. In the inner face of this cylinder is provided a screw-like groove 24 of a width adapted to accommodate the corrugated flange portions 25 of the metallic caps 26 (shown in Fig. 5 of the drawings). In its top the cylinder 23 is provided with a slot 24', extending from its end 23' inward toward the starting point of the groove 24 and forming the inlet of said groove. At the end of each half turn of the groove the cylinder is provided in a vertical plane with an aperture, said apertures being numbered in succession 27, 28, 29 and 30. These apertures extend through the wall 31 of the cylinder, communicate with said groove and are of a diameter which is slightly less than the outer diameters of the corrugated flange portions of the metallic members of the closure. The groove terminates at 32 in the cylinder, the terminating point being the outlet thereof. In the cylinder is arranged a feeding drum 33, said drum being keyed to a shaft 34, which is rotatably supported in bearings 35, 35, said bearings being carried by the frame member 22. The length of the feeding drum corresponds to that of the cylinder 23, and its diameter corresponds substantially to the inner diameter of said cylinder. The drum is provided with longitudinal peripheral grooves 36, 36, which are located 90° apart and run parallel to the longitudinal axis of said drum. The width of each groove corresponds substantially to the diameter of the head portion 37 of the metallic part of the closure, and the depth of each groove corresponds substantially to the height of said head portion. The flange portion of the cap projects beyond the periphery of the drum and is arranged in the groove 24, as clearly shown in Fig. 12 of the drawings. If a metallic cap is placed through the slot 24' into the groove of the cylinder and a groove of the feeding drum, it will be observed that, by rotating the feeding drum, the said cap will be moved along the groove 24 in said cylinder. In moving along this groove, it will slide along the said groove in the feeding drum and be disengaged from the mechanism as soon as the said groove in the drum registers with the outlet 32 of the groove 24. This outlet may be somewhat enlarged to permit of an easy disengagement of the cap from the mechanism.

The driving shaft 38 of the apparatus is journaled in bearings 39, 39, which are mounted upon the base plate 20. A driving pulley 40 is keyed or otherwise attached to the shaft 38, and rotated by the intermediary of a suitable belt from a countershaft or a motor shaft. To one of the bearings 39 is attached a bracket 41, supporting a receptacle 42, to which leads a chute 43 from the outlet 32 of the groove in the cylinder. Rotary motion is imparted to the feeding drum 33 from the shaft 38 by an eccentric 44, the rod 45 of which is pivoted at 46 to a plate member 47, which is slidably arranged in guides 48, 48, which latter form part of one of the bearings 35. This plate member is provided in its inner surface with a semi-circular groove 49, adapted to be engaged in a manner hereinafter to be described by pins 50, 50, which are mounted upon the outer face of a disk 51, the latter being fixedly attached to the shaft 34 of the feeding drum 33. In one of the sides of the plate member 47 is formed a recess 52, in which is slidably arranged a latch 53, held by means of a spring 54 in its normal outer position, shown in full lines in Fig. 10 of the drawings. There are four pins 50 upon the disk 51 arranged 90° apart at a distance which corresponds to the width of the plate member 47. In the position shown in full lines in Fig. 10 of the drawings the reciprocable plate member is in its uppermost position, in which case there are two pins upon each side of said plate member. The disk 51 and thus the feeding drum will be thereby held firmly in position until the eccentric in its further rotation starts the downward movement of the plate member. During the downward movement of said plate member, the pin which is in the position denoted by the numeral I is moved in the direction of the arrow shown in Fig. 10 in an arc-shaped path downward until it reaches the position II, causing thereby one-quarter of a revolution of the feeding drum 33. That pin which has been, before the movement started, in the position II moves in an arc-shaped path along the groove 49 until it reaches the position III; the pin which had been in position III moves into position IV outside of the plate member 47, and that pin which has been in position IV moves in an arc-shaped path along the groove 49 until it reaches the position I. During the upward movement of the plate member 47, the pins are not acted upon by the said plate member, whereby the drum will be kept stationary. It is obvious that when, in the upward movement of the plate member, the inclined surface 55 of the latch 53 comes into contact with the pin at position I, it will be forced into the recess 52 against the action of the spring 54, which will, as soon as the point of said latch is disengaged from said pin, cause the said latch to assume its position shown in Fig. 10 of the drawings, whereby the plate member is again ready for action. It will be noted that, since the four pins abut against the sides of the member 47 during the upward movement, the drum 33 will be kept fixed during the upward movement of said plate member. While the drum is kept stationary, two of its grooves register with the apertures in the cylinder.

The metallic caps are fed to the cylinder 23 in their inverted positions, preferably automatically, through a chute 56, which delivers them to a platform 57 in a direction substantially at right angles to the longitudinal axis of the cylinder, and more particularly opposite to the slot 24' in the said cylinder. In alinement with said slot is slidably mounted a feeding finger 58, normally kept by means of springs 59, which bear against the cylinder 23 and against lugs 60, against an inclined surface 61 upon the upper end of the reciprocable plate member 47. When this plate member moves downward, the said springs will force the feeding finger 58 outward and permit thereby the feeding of a cap onto the platform 57 in alinement with the slot 24' and a groove 36 in the drum. As the plate member 47 moves upward, the said cap will be fed through the slot 24' into engagement with the groove 24 in the cylinder and the groove 36 in the drum, the inclined surface 61 acting against the feeding finger and forcing the same toward the cylinder and the drum. When the cap is engaged by the cylinder and the drum, and the drum is rotated in the manner above described, it will be fed along the groove 24 a distance corresponding to an angular travel of 90° of the drum, stop at such point until another cap is fed into the groove, and be then moved along a distance corresponding to the angular travel of 90° of the drum, whereby it will come into registering position with the aperture 27 in the bottom of the drum and stop there in an upright position during the upward movement of the plate member 47. While the said plate member is moving upward and the drum is kept stationary, an adhesive substance is applied to the inner face of the head of the cap from a trough 62, which is attached to the underside of the frame member 22. The means for applying the adhesive substance to the cap comprises a plunger 63, which is reciprocably mounted in a guide 64 in the trough and is attached to a yoke 65, the latter being pivoted at 66 to the rod 67 of an eccentric 68, which is keyed to the driving shaft 38. The plunger 63 is shown in detail in Figs. 14 and 15, and comprises a hollow member, having a plurality of perforations 64' in its wall and provided with a head 65', which is screwed or otherwise attached to the body thereof. In said head are provided a large number of perforations 66', through which project pins 67', which are slidably arranged in the plunger,
their lower ends being seated in recesses 68' in the bottom portion of the plunger. To limit the outward movement of the pins 67', the latter are provided with enlargements 69, against which bear springs 70, coiled around the pins and arranged in the said plungers, the other ends of said springs bearing against the bottom portion of the plunger. The pins are thus resiliently supported, and adapted to contact with the inner face of the caps no matter how uneven or convex said face be. A stuffing box 71 is provided in the bottom of the trough 62 at the point through which the yoke 65 extends through the said bottom. The eccentrics 44 and 68 are keyed to the driving shaft in such a manner that the plunger 63 starts its downward movement before the plate member 47 starts in that direction and moves upward while the drum 33 is kept stationary and a metallic member of the closure is held with its flange downward in registering position with the aperture 27 in the bottom of the cylinder 23. In moving upward, the pins 67', which have been immersed in the adhesive material contained in the trough 62, will apply adhesive material adhering to them to the inner face of the head of the caps 26. By applying the adhesive material to the caps in their upright positions, all of the same will receive the same quantity of adhesive material. The cap is then transported step by step until it registers in an inverted position with the aperture 28 in the top of the cylinder 23. When in this position, a disk of paper or any suitable material is placed into said cap. The disk 72, shown in Fig. 7 of the drawings, is cut from a strip 72', wound upon a reel 73, which is suitably journaled in the frame of the machine, and from which the strip is conducted into a guide 74, to pass between the feeding rollers 75 and 76. These feeding rollers are suitably journaled in bearings on the frame of the machine, the lower one, that is the feeding roller 76, projecting through a slot 77 in the guide 74 above the lower plane of the latter, its shaft 76' being provided with a ratchet wheel 78, the teeth of which mesh with a pawl 79, which is pivoted at 80 to a rod 81. When this rod moves upward, it will rotate the shaft 76' and advance thereby the strip 72' in the direction of the arrow shown in Fig. 11 toward the cutting means 82. The feeding rollers are rotated intermittently, that is to say they will rotate while the rod 81 is moving upward and kept stationary while the latter is going downward. The cutting means comprises a tubular cutter 82', which is secured in any suitable manner to an arm 83, the latter being slidably arranged in vertical guideways 84 of brackets 85, which are attached to the top of the cylinder 23. The arm 83 is carried by the rod 81 above-mentioned. This rod is pivotally connected with a rod 86 of an eccentric 87, which latter is keyed to the driving shaft 38. The eccentrics 87 and 44 are keyed at an angle of about 180° relative to each other to the driving shaft 38. Owing to this arrangement, the plate member 47 moves upward when the eccentric rod 86 moves downward and vice versa. When the tubular cutter 82' moves downward, a disk is cut from the strip and is automatically forced, upon the upward movement of the cutter, by a stem 88, which is slidably arranged in the cutter, into the metallic cap. The stem 88 projects through an opening in the arm 83 above the plane of said arm, and carries upon its upper end a weight 89. When, therefore, the cutter 82' moves upward, the weight 89 will force the stem downward and thereby the paper disk into the cap. After this, upon the further upward movement of the arm 83, the latter will engage the weight 89 and lift thus the stem 88. From the foregoing it will be observed that during the downward movement of the eccentric rod 86, or in other words while the metallic cap is being transported into registering position with the opening 28 in the cylinder 23, the strip 72' is fed into the proper position, and during the downward movement of the eccentric rod 86, the disk is cut and deposited into the cap, or in other words the cutting operation takes place while the cap is held stationary. The disk having been deposited into the metal cap, the latter is conveyed step by step into registering position with the opening 29 in the bottom of the cylinder to be held there in its upright position in order to receive upon the exposed surface of the disk adhesive material. The adhesive material is applied to the disk by a plunger mechanism 90, which is arranged within the tank 62, and is in all respects identical with the plunger mechanism 63 above described. The plunger 90 is attached to the yoke 65. After this operation the metallic cap with the paper disk is transported step by step to the opening 30 in the top of the cylinder 23 to receive in its inverted position a sealing disk. Above the opening 30 is arranged an assembling plunger 91, which is slidably mounted in vertical guides 92, and is connected by means of an arm 93 with the arm 83 of the cutter 82'. The sealing disks 94' are placed in a vertical tube 94, which is attached to the guide 92 by means of a bracket 95, and is provided with a longitudinal slot 96, through which a finger piece 97 of a weight 98 protrudes, said weight being placed on top of the sealing disks and serves to feed the said disks into a guideway 99 of a reciprocable conveyer 100. The guideway 99 is provided in its bottom with an opening 101, which registers with the aperture 30 in the top of the cylinder 23. The outer end of the reciprocable conveyer 100 contacts with an inclined surface 102 of a block 103, which is carried by the rod 81. A spring 104 serves to force the said conveyer continuously into contact with the inclined surface 102 of said block. The conveyer 100 engages the lowermost of the sealing disks 94' in the tube 94, and transfers the same to the opening 101 during the upward movement of the rod 81, or in other words while the assembling plunger 91 is being lifted. The latter will in its downward movement force the sealing disk through the opening 101 and aperture 30 into the metal cap. The opening 101 in the bottom of the guideway 99 tapers toward the cylinder 23, its upper end being larger than the diameter of a sealing disk 94', and the diameter at its lower end being somewhat smaller than that of a sealing disk. For this reason the sealing disk will be compressed to some extent when it passes through the opening 101 and will, when forced into the cap, expand to be held thus firmly in the cap. The assembling plunger, besides that it forces the sealing disk on top of the disk 72, exerts at the same time pressure upon the component parts of the closure and firmly unites thereby the said parts, for the reason that adhesive material is still in its semi-solid condition when the parts of the closure arrive at the aperture 30. During the next quarter of a revolution of the drum 33 the assembled closure is transported to the outlet 32 and discharged there into the chute 43, in which it slides into the receptacle 42.

Recapitulating now the operation of the machine, we find that the feeding drum 33 moves intermittently making at each movement a quarter of a revolution and stopping then while the plate member 47 moves upward. During the movement of the feeding drum, a disk 72 is cut and a sealing disk or cork disk is fed in proper relation to the aperture 30 in the top of the cylinder 23. During the rest of the feeding drum, the eccentric rods 67 and 86 move in opposite directions and actuate thereby the plungers 63 and 90, the cutter 82' and the assembling plunger 91, the plunger 63 serving to apply adhesive material to the inner face of the head of the metal cap, the cutter 82' to cut the disk from the strip 72' and deposit the same into the cap, the plunger 90 serving to apply adhesive material to the exposed surface of the disk, and the assembling plunger 91 serving to force the sealing disk into the cap and to unite the parts of the closure.

A modification of the invention is illustrated in Figs. 16 to 18, inclusive, which differs from the one previously described in that it lacks the means for feeding, cutting and depositing disks 72 into the metal cap. In this case there is no paper disk deposited into the cap, and obviously only one adhesive material applying plunger is needed. Otherwise the construction and operation of the device is in all respects identical with that described in connection with Figs. 1 to 15, inclusive. Briefly described, the machine shown in Figs. 16 to 18, inclusive, consists of a base plate 110, standards or legs 111, to which is attached a horizontal frame member 112, the latter supporting a cylinder 113, having a groove 114 similar to the screw-like groove 24 above described. There is an aperture 115 in the bottom of the cylinder and an aperture 116 in the top of the same which communicate with the groove 114. The outlet of the groove is denoted by the numeral 117. A feeding drum 118, provided with longitudinal peripheral grooves 119, is rotatably mounted in bearings 120, said bearings being attached to the horizontal frame member 112. The grooves 119 in the drum are spaced apart 90°, and run parallel to the longitudinal axis thereof. They correspond to the groove 24 of the device above described. The driving shaft 121 is mounted in bearings 122, 122 and serves to actuate the reciprocable plate member 123, which corresponds to the plate member 47 of the machine above described. The driving shaft actuates at the same time a plunger 124, which applies adhesive material through the aperture 115 to the inner face of the head of the metallic cap, which is transported then to an assembling plunger 125, forcing through the aperture 116 a sealing disk into the cap and uniting the same therewith. The sealing disks are fed to the aperture 116 from a tubular member 126 by the intermediary of a reciprocable conveyer 127, the conveyer and the feeding plunger 125 being actuated by an eccentric 128, keyed to the driving shaft 121. The plungers 124 and 125 move in opposite directions during the upward movement of the reciprocable plate member 123, which feeds the metallic caps from a chute 128', by means of a feeding finger 129 through a slot 130 into the cylinder 113 and the drum 118. The operation of this machine is as follows: During the downward movement of the reciprocable plate member 123, the drum 118 is given a quarter of a turn and a sealing disk or cork disk is fed into registering position with the aperture 116 in the top of the cylinder 113. During the upward movement of the plate member, that is to say while the drum is kept stationary, a metal cap is fed to the drum, the one being in its upright position in alinement with the aperture 115 is provided with adhesive material upon its inner surface, and the one opposite to the aperture 116 is charged with a sealing disk in the manner described in connection with Figs. 1 to 15, inclusive. The sealing disk being united with the cap, the assembled closure is during the next quarter of a turn of the drum discharged through the outlet 117 into a chute 131, to slide into a receptacle 132. The adhesive material which is placed by the plunger 124 into the cap is sufficient to form a film between the inner face of the metallic cap and the sealing disk of impervious nature; it is sufficient to form a hermetic seal and to prevent the liquid contents of the bottle to which the closure is applied from coming into contact with the inner face of the cap. Caps manufactured by this modified machine are, of course, cheaper, owing to the fact that no paper disks are applied to the same, and that they can be made quicker than those upon the machine shown in Figs. 1 to 15, inclusive.

What I claim is:—

1. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and means for conveying the metallic cap in succession to each of the elements mentioned.

2. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and a single rotary means for conveying the metallic cap in succession to the elements mentioned.

3. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and means for conveying the metallic cap in succession to each of the elements mentioned and for causing the cap to stop when brought in succession into registering positions with the said elements.

4. In a machine for the manufacture of bottle colsures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and a single rotary means for conveying the metallic cap in succession to the elements mentioned and for causing the cap to stop when brought in succession into registering position with the said elements.

5. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and means for conveying the metallic cap in succession to each of the elements mentioned and holding said cap with its flange downward when brought into registering position with both said adhesive material applying means.

6. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and a single rotary means for conveying the metallic cap in succession to the elements mentioned and holding said cap with its flange downward when brought into registering position with both said adhesive material applying means.

7. In a machine for the manufacture of bottle closures of the cap variety, the combination with means for applying adhesive material to the inner face of the head of the metallic cap, means for placing a thin disk into the cap, means for applying adhesive material to the exposed face of said disk, means for depositing a sealing disk into the cap on top of said first named disk, and a single intermittently moving rotary means for conveying the metallic cap in succession to the elements mentioned and holding said cap with its flange downward when brought into registering position with both said adhesive material applying means.

8. In a machine for the manufacture of bottle closures of the cap variety, the combination with a cylinder having an internal screw-like groove and a plurality of apertures communicating with said groove, a drum rotatably mounted within said cylinder having a plurality of longitudinal peripheral grooves, and means for intermittently moving said drum and causing the same to stop when its grooves are in alinement with said apertures.

9. In a machine for the manufacture of bottle closures of the cap variety, the combination with a cylinder having an internal screw-like groove and a plurality of apertures communicating with said groove, a drum rotatably mounted within said cylinder having a plurality of equidistantly situated longitudinal peripheral grooves, and means for intermittently moving said drum and causing the same to stop when its grooves are in alinement with said apertures.

10. In a machine for the manufacture of bottle closures of the cap variety, the combination with a cylinder having an internal screw-like groove and a plurality of apertures communicating with said groove, a drum rotatably mounted within said cylinder having a plurality of equidistantly situated parallel longitudinal peripheral grooves, and means for intermittently moving said drum and causing the same to stop when its grooves are in alinement with said apertures.

11. In a machine for the manufacture of bottle closures of the cap variety, the combination with a cylinder having an internal screw-like groove and a plurality of apertures communicating with said groove, a drum rotatably mounted within said cylinder having a plurality of longitudinal peripheral grooves, and reciprocable means for intermittently moving said drum and causing the same to stop when its grooves are in alinement with said apertures.

12. In a machine for the manufacture of bottle closures of the cap variety, the combination with a cylinder having an internal screw-like groove and a plurality of apertures communicating with said groove, a drum rotatably mounted within said cylinder having a plurality of equidistantly situated longitudinal peripheral grooves, and reciprocable means for intermittently moving said drum and causing the same to stop when its grooves are in alinement with said apertures.

13. In a machine for the manufacture of bottle closures of the cap variety, the combination with a cylinder having an internal screw-like groove and a plurality of apertures communicating with said groove, a drum rotatably mounted within said cylinder having a plurality of longitudinal peripheral grooves, a disk attached to said drum, pins upon the outer face of the disk arranged equidistantly in a circle, a reciprocable plate member, a latch upon said plate member in engagement with one of said pins when said plate member is in one of its outermost positions, whereby said disk is rotated a given distance upon the movement of the plate member in one direction, said plate member engaging all of said pins when moving in the other direction, causing 14. In a machine for the manufacture of bottle closures of the cap variety, the combination with a cylinder having an internal screw-like groove and a plurality of apertures communicating with said groove, a drum rotatably mounted within said cylinder having a plurality of longitudinal peripheral grooves, a disk attached to said drum, pins upon the outer face of the disk arranged equidistantly in a circle, a reciprocable plate member, a latch upon said plate member in engagement with one of said pins when said plate member is in one of its outermost positions, whereby said disk is rotated a given distance upon the movement of the plate member in one direction, said plate member engaging all of said pins when moving in the other direction, causing thereby said drum to stop and to be held in fixed position.

15. In a machine for the manufacture of bottle closures of the cap variety, the combination with a cylinder having an internal screw-like groove and a plurality of apertures communicating with said groove, a drum rotatably mounted within said cylinder having a plurality of longitudinal peripheral grooves, means for applying adhesive material to the inner face of a metallic cap in the groove in said cylinder and one of the grooves in said drum, said paste applying means being in alinement with one of the apertures in said cylinder, and means for intermittently moving said drum and causing same to stop when its grooves are in alinement with said apertures and holding said cap with its flange downward when brought into registering position with said adhesive material applying means.

Signed at New York, in the county of Kings and State of New York, this 12th day of April, A. D. 1912.

ALEXANDER BOGDÁNFFY.

Witnesses:
SIGMUND HERZOG,
WM. KLINK.